(12) United States Patent
Weidner et al.

(10) Patent No.: US 9,798,101 B1
(45) Date of Patent: Oct. 24, 2017

(54) LENS ASSEMBLY METHOD AND SYSTEMS

(71) Applicant: Fluke Corporation, Everett, WA (US)

(72) Inventors: William Weidner, Dublin, NH (US);
Daniel Fournier, Fitzwilliam, NH (US)

(73) Assignee: Fluke Corporation, Everett, WA (US)

( * ) Notice: Subject to any disclaimer, the term of this patent is extended or adjusted under 35 U.S.C. 154(b) by 508 days.

(21) Appl. No.: 14/473,663

(22) Filed: Aug. 29, 2014

Related U.S. Application Data

(60) Provisional application No. 61/872,350, filed on Aug. 30, 2013.

(51) Int. Cl.
G02B 7/02 (2006.01)
G02B 27/62 (2006.01)

(52) U.S. Cl.
CPC .............. G02B 7/02 (2013.01); G02B 27/62 (2013.01)

(58) Field of Classification Search
CPC . G02B 7/02; G02B 7/023; G02B 7/08; G02B 27/62
USPC ............. 29/407.09; 359/811–830; 248/208.8
See application file for complete search history.

(56) References Cited

U.S. PATENT DOCUMENTS

| | | | | |
|---|---|---|---|---|
| 5,572,785 A | * | 11/1996 | Tveit | G02B 7/02 29/283 |
| 7,715,129 B2 | * | 5/2010 | Neely | G02B 7/023 359/819 |
| 2010/0044538 A1 | * | 2/2010 | Lee | B25B 11/007 248/205.8 |

OTHER PUBLICATIONS

U.S. Appl. No. 14/459,107, filed Aug. 13, 2014, 30 pages.
U.S. Appl. No. 14/470,601, filed Aug. 27, 2014, 31 pages.

* cited by examiner

Primary Examiner — Bumsuk Won
Assistant Examiner — Collin X Beatty
(74) Attorney, Agent, or Firm — Fredrikson & Byron, P.A.

(57) ABSTRACT

Methods and systems for mounting a lens in a lens cell. The system may include a spindle assembly including a motor and a spindle, which may be an air bearing spindle, a passage within the spindle and an opening at the end of the passage at the surface of the spindle head, a vacuum source connected to the passage of the spindle to create suction at the opening, a stage configured to securely receive a lens mount with a lens cell such that a central axis of the lens cell is coaxial with the axis of rotation of the spindle, a micropositioner configured to reposition the lens on the spindle head, and a motion gauge configured to detect eccentric rotation of a lens as lens motion when the lens is positioned on the head of the rotating spindle.

17 Claims, 12 Drawing Sheets

LENS ASSEMBLY METHOD AND SYSTEMS

PRIORITY

The present application claims priority to U.S. Pat. No. 61/872,350, filed Aug. 30, 2013, the disclosure of which is hereby incorporated by reference in the entirety.

BACKGROUND

Installation of a lens into a high precision lens assembly, particularly nontraditional lens assemblies such as those that may be used in thermal imaging cameras and other cameras, requires a time consuming and costly alignment process to assure precise positioning of the lens. For example, the lens must not only have its optical axis aligned but must also be parallel to the cell in which it is mounted and have no tilt. If multiple lenses are used, the optical axis of all lenses must be precisely aligned and they must each be parallel to each other. Any errors in alignment will negatively impact the images produced by the lenses. In order to achieve this precise lens placement, the components holding the lens must be manufactured with extremely tight tolerances. For example, if a bore is used to mount the lens, it must be manufactured with very tight tolerances with regard to multiple factors including true position, circularity and concentricity. In addition, highly qualified surfaces are traditionally required to attain proper lens placement, which result in further expense. More sophisticated methods still require a perfectly qualified lens shelf. The manufacture of the component pieces, including the mounts and the lenses to such high tolerances is expensive, as is the time consuming process of mounting the lens.

In some systems, high precision lens mounting can be achieved when mounting a lens through the use of high tolerances in the manufacture of the components and the use of qualified lenses. However, the use of such high tolerances is very expensive, making it too expensive for some applications.

For lens assemblies with lower tolerances, one method of mounting high precision lenses into a lens cell includes the use of sets of gauged pins having sizes that vary in small increments. The lens is placed into the lens cell, then a first set of pins of equal diameter is placed into the gap between the edge of the lens and the inside wall of the lens cell. For example, three pins may be placed into the gap, spaced apart around the lens. If the fit is too loose, the pins are removed and replaced with another set of pins having a slightly larger diameter. If the fit is too tight, the pins are removed and replaced with another set having a slightly smaller circumference. The process is repeated until the desired snug fit of the pins is achieved. In this way, the lens is stabilized in a centered location in the lens cell. The lens can then be adhered to the cell and the pins can be removed. This iterative process is performed manually, requiring a large amount of time and expense.

Another method of mounting high precision lenses uses an optical alignment system. In this method, the lens is mounted on an air bearing spindle and is gently nudged into alignment. For example, the operator may nudge the edge of the lens using a cotton swab to attempt to center the lens. The alignment of the lens is determined using an autocollimator, which passes a laser beam through the lens or is reflected off the lens while it rotates on the air bearing spindle. The operator must observe the transmitted or reflected laser light beam for wobbling, which indicates a decentered position of the spinning lens, to determine if the lens is properly centered, and must adjust the lens by manually nudging it back and forth until the proper alignment is achieved as indicated by observation of the laser beams. High tolerances can be achieved by this method, but it is laborious and time consuming. This taxing process to mount one lens may take between 15 minutes and one hour, for example, resulting in considerable operator fatigue.

Because of the existing processes for mounting lenses are time consuming and difficult, alternative processes which are quicker and simpler are desired.

SUMMARY

Various embodiments include systems and methods for mounting a lens in a lens cell. In some embodiments, the system may include spindle assembly including a motor and a spindle, such as an air bearing spindle, which can be activated to rotate on an air bearing about an axis of rotation. The spindle includes a head having a surface, an airtight passage within the spindle, and an opening at the end of the airtight passage at the head surface. The system may further include a vacuum source connected to the airtight passage of the spindle to create suction at the opening, a stage configured to securely receive a base including a lens cell such that a central axis of the lens cell is coaxial with the axis of rotation of the spindle, a micropositioner configured to advance or retract within a plane perpendicular to the axis of rotation, and a motion gauge configured to detect movement of an object.

In some embodiments, the micropositioner includes a body and a head, wherein the head is configured to be advanced and retracted relative to the body in increments as small as 0.00005 inches, for example.

In some embodiments, the motion gauge comprises a dial indicator. The motion gauge may be configured to detect movement as small as a movement of 0.0001 inches, for example. The motion gauge may include a head, wherein the motion gauge is configured to detect motion of an object when the head is in contact with the object. The motion gauge may further include a display which is configured to display a measurement of movement when movement of an object is detected. The motion gauge may be configured to advance and retract in the same plane as the head of the micropositioner.

The stage and the air bearing assembly may be mounted in alignment, and the system may further include a translation element configured to bring the spindle into and out of proximity with the stage while maintaining the alignment.

In some embodiments, the system includes a UV light source for curing UV adhesive.

In some embodiments, the system for mounting a lens in a lens cell includes spindle assembly including a motor and a vertically oriented spindle, such as an air bearing spindle. The spindle may include a head having a surface at a lower end, an upper end comprising an air bearing, an air passage within the spindle, and an opening at the end of the air passage at the head surface, wherein the spindle is configured to rotate about a central axis on the air bearing. The system may further include a vacuum source connected to the air passage of the spindle to create suction at the opening in the head of the spindle, a stage directly beneath the head of the spindle configured to securely receive a lens mount with a lens cell such that the central axis of the lens cell is coaxial with the central axis of the spindle, wherein the stage is configured to be moved vertically while maintaining the central axis of the lens cell coaxial with the axis of rotation of the spindle, a micropositioner configured to advance or retract horizontally. The micropositioner may include a body and a head wherein the head can be advanced or retracted horizontally relative to the head to a location in proximity to the head of the spindle. The system may further include a motion detection gauge configured to detect motion of an object when in contact. The motion detection gauge may include a head for detecting motion of an object and may be configured to be advanced or refracted horizontally to another location in proximity to the head of the spindle.

In some embodiments, the head of the micropositioner is configured to be advanced and retracted relative to the body in increments as small as 0.00005 inches.

In some embodiments, the motion gauge comprises a dial indicator and is configured to detect movement as small as a movement of 0.0001 inches. The motion gauge may include a display which is configured to display a measurement of movement when movement of an object is detected. In some embodiments, the motion gauge is configured to advance and retract in the same plane as the micropositioner.

In some embodiments, the system also includes a UV light source for curing UV adhesive.

Other embodiments include methods of mounting a lens in a lens cell using an air bearing assembly. The method may include activating a vacuum wherein the vacuum is in air flow communication with a head of a spindle, positioning the lens on the head of the spindle wherein the lens is held on the head of the spindle by the vacuum, and activating rotation of the air bearing spindle, with the lens on its head, on an air bearing. The method may further include advancing a micropositioner toward the rotating lens until a head of the micropositioner contacts an edge of the lens, advancing a motion gauge toward the rotating lens until a head of the motion gauge contacts the edge of the lens, advancing the micropositioner head against the edge of the rotating lens to reposition the rotating lens on the head of the spindle until the motion gauge detects no motion of the edge of the lens perpendicular to its axis of rotation, and then stopping advancing the micropositioner, stopping rotation of the air bearing spindle, bringing the lens into contact or into virtual contact with a lens cell mounted on a stage while maintaining alignment of the lens and the lens cell, and affixing the lens to the lens cell.

In some embodiments, affixing includes applying adhesive.

The method may further include observing the motion gauge for motion during the step of advancing the micropositioner against the edge of the rotating lens to reposition the rotating lens on the head of the spindle.

In some embodiments in which the lens cell is a component of a lens assembly base, the method further includes mounting the lens cell and base on a stage, wherein bringing the lens into contact or virtual contact with the lens cell comprises raising the stage toward the spindle. The method may further include, after affixing the lens to the lens cell, mounting a supplemental lens cell onto the base.

FIGURES

The following figures are illustrative of particular embodiments of the present invention and therefore do not limit the scope of the invention. The figures are intended for use in conjunction with the explanations in the following detailed description. Embodiments of the present invention will hereinafter be described in conjunction with the appended figures and photographs.

DETAILED DESCRIPTION

Figure 1A:
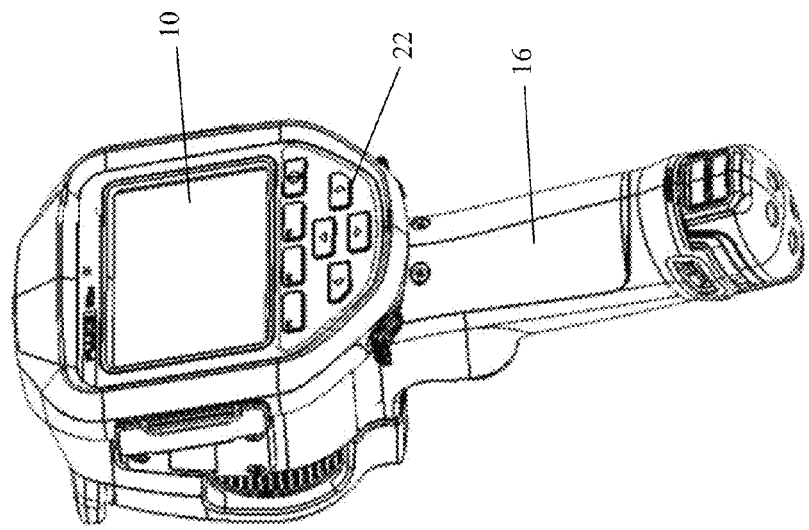
FIGS. 1a and 1b are front and rear perspective views of a thermal imaging camera in which lens assemblies may be used according to various embodiments.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. In the following description, where applicable, like reference numbers will be used for like components. It should be appreciated that components of the invention may vary among embodiments of the invention while remaining functionally similar. In such cases, like reference numbers may also be used.

Various embodiments described herein include systems and methods for efficiently and precisely mounting a lens within a lens cell. The systems and methods are particularly useful for mounting high precision lenses into systems in which the optical axis of the lens must be precisely aligned, such as with a target and/or other lens, and in which the lens must have no tilt. Examples of such high precision lenses include lenses used in cameras including lenses used for visible light images as well as for thermal images, such as in thermal imaging cameras. The systems and methods may also be used for mounting lenses in other devices, such as microscopes, telescopes, or any other device which uses high precision lenses which must be precisely mounted in a lens cell during manufacture of the device.

Various embodiments achieve a high level of precision in positioning the lens through the use of an air bearing assembly in combination with a micropositioner and a motion gauge. The lens may be positioned on a rotating spindle portion of an air bearing assembly and held in position on the rotating spindle by a vacuum. As the lens rotates with the spindle, its position on the spindle may be adjusted by an operator using the micropositioner, such as the head of a rigidly mounted micrometer, until the lens is correctly centered on the mount as determined by observation of the gauge. Once the desired alignment is achieved, the lens and the lens cell may then be brought together, such as by moving the spindle and lens toward the mounted lens cell, or by moving the mounted lens cell toward the lens and spindle. The lens may be moved into position until it contacts the lens cell or may be positioned to stop in virtual contact with the lens cell but without actually contacting the cell. For example, the lens may be between approximately 0.001 and 0.01 inches, such as between approximately 0.002 and 0.006 inches, or approximately 0.004 inches. The lens may then be affixed to the lens cell, such as through the use of UV potting. Additional lens assembly components and lens cells for supplemental lenses may then be added, and the one or more supplemental lenses may be precisely aligned and mounted on the lens assembly in the same manner.

The use of the air bearing system allows the proper lens location to be achieved even if the lens cells do not have qualified surfaces (that is, they do not have lens shelf perpendicularity to optical axis, lens shelf axial location, and cell ID runout to optical axis within tight tolerances). Unlike previous systems which required high tolerances and qualified lenses and were therefore very expensive, or which required time consuming mounting processes, the system and methods described herein reduce the stringency of the tolerances required in the mounting mechanisms and processes and dramatically reduce time and expense. This is particularly useful in designs such as lens cells on bayonet mounts and linear bearing systems, such as the Gemini autofocus mechanism/lens, which would require highly expensive components if other lens installation techniques were to be used.

Figure 1B:
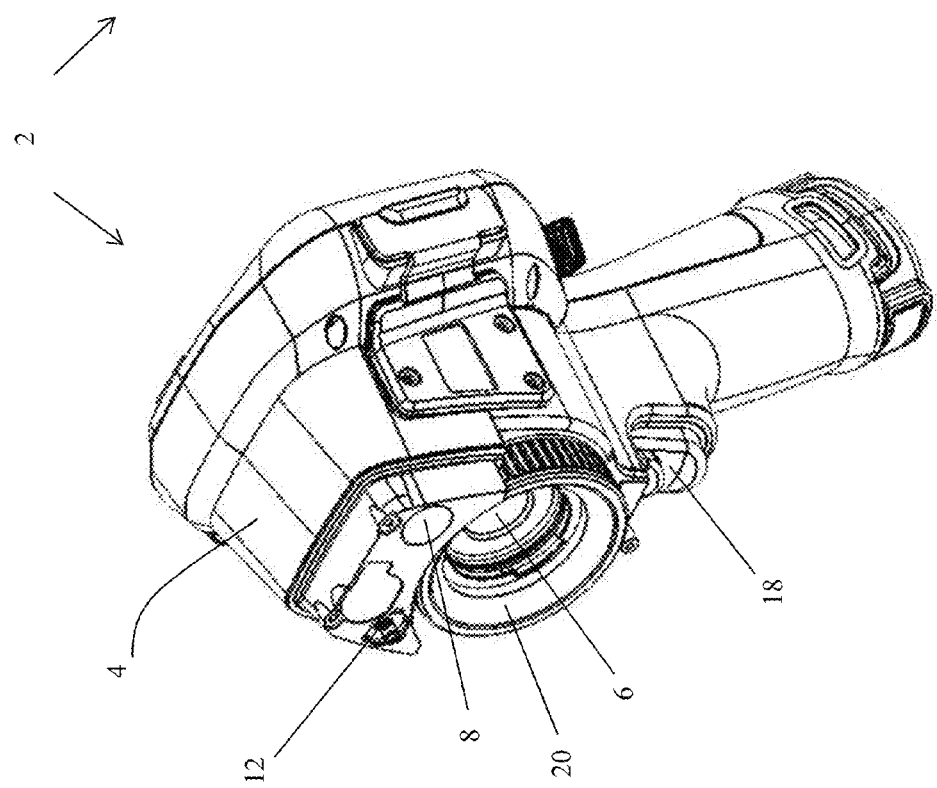

An example of a camera for which the lens assembly may be produced according to various embodiments described herein is shown in FIGS. 1a and 1b, which show front and rear perspective views of an example thermal imaging camera 2, respectively. Thermal imaging cameras such as this may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor or focal plane array and/or a visible light optics to focus the visible light on a visible light sensor or focal plane array. In general, a light sensor may refer to a visible light or an infrared sensor.

The camera 2 shown in FIGS. 1a and 1b comprises a housing 4, an infrared lens assembly 6, a visible light lens assembly 8, a display 10, a laser range finder 12, and a trigger control 18. Housing 4 houses the various components of thermal imaging camera 2. The bottom portion of thermal imaging camera 2 includes a carrying handle 16 for holding and operating the camera via one hand. Infrared lens assembly 6 receives infrared radiation from a scene and focuses the radiation on an infrared sensor for generating an infrared image of a scene. Visible light lens assembly 8 receives visible light from a scene and focuses the visible light on a visible light sensor for generating a visible light image of the same scene. The visible light and/or infrared sensors, as well as elements of the infrared and/or visible light lens assemblies, may be positionable in order to adjust the focal plane of the corresponding radiation. In some embodiments, the camera 2 may comprise a motor configured to position a focusing device such as a lens. In alternative embodiments, the motor may instead be configured to position the light sensor or focal plane array in addition or alternatively to moving the lens. In certain embodiments, the motor may comprise a servo motor, a piezoelectric motor, or others known in the art.

Thermal imaging camera 2 captures the visible light image and/or the infrared image in response to depressing trigger control 18. In addition, thermal imaging camera 2 controls display 10 to display the infrared image and the visible light image generated by the camera, e.g., to help an operator thermally inspect a scene. Thermal imaging camera 2 may also include a focus wheel assembly 20 coupled to the infrared lens assembly 6 that is configured to move at least one lens of the infrared lens assembly so as to adjust the focus of an infrared image generated by the thermal imaging camera. A user interface 22 may also be included to allow the user to select or adjust parameters or interact with the camera in other ways.

Figure 2:
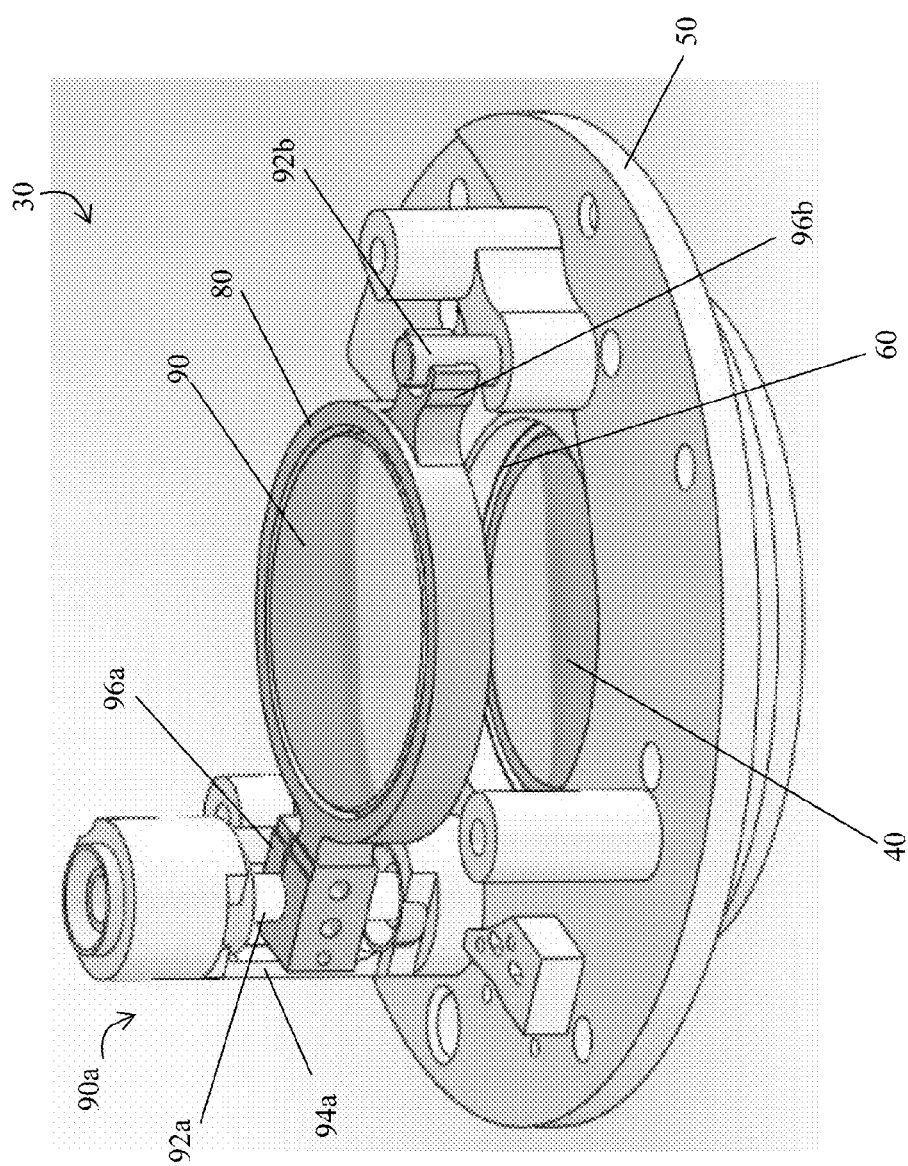
FIG. 2 is a front perspective view of a partial lens assembly according to various embodiments.
Figure 3:
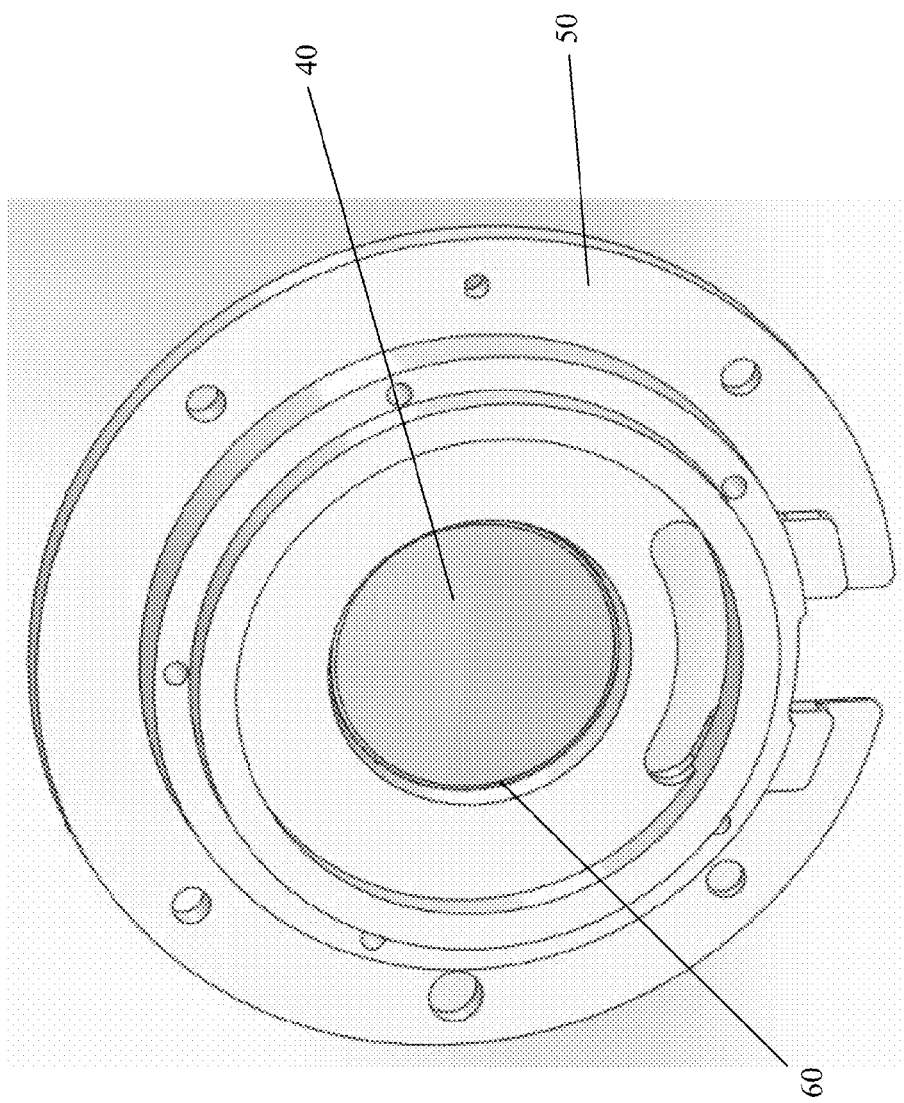
FIG. 3 is a rear perspective view of the lens assembly of FIG. 2.

An example of a lens assembly 30 which may be used in thermal imaging camera 2 or other devices and which may first be produced according to various embodiments is shown in FIGS. 2 and 3, which show front and rear perspective views of the lens assembly respectively. The lens assembly 30 may be an infrared lens assembly 6 or a visible light lens assembly 8, for example. The lens assembly 30 includes a first lens 40 mounted in a base 50 having a first lens cell 60 and a second lens 90 mounted above the first lens 40 in a second lens cell 80. In FIG. 3, the underside of the base 50 is shown with lens 40 inside the lens cell 60. Other components of the assembly include a first linear guide system 90a, including a first elongated element 92 with a first elongated element support 94a and a first engagement feature 96a. The lens assembly may further include a second linear guide system 90b, with a second elongated element 92b, second elongated element support (not shown) and second engagement feature 96b. The lens assembly 30 may further include a motor (not shown), which allows the second lens 90 within the second lens cell 80 to move relative to the first lens 40 for focusing purposes. Examples of linear guide systems and lens assemblies with which various embodiments of the lens mounting method and systems may be used are described in U.S. patent application Ser. No. 14/459,107, entitled Lens Assembly with a Linear Guide System, and in U.S. patent application Ser. No. 14/470,601, entitled Linear Guide Systems for a Lens Assembly, the disclosures of both of which are hereby incorporated by reference in the entirety.

Figure 4:
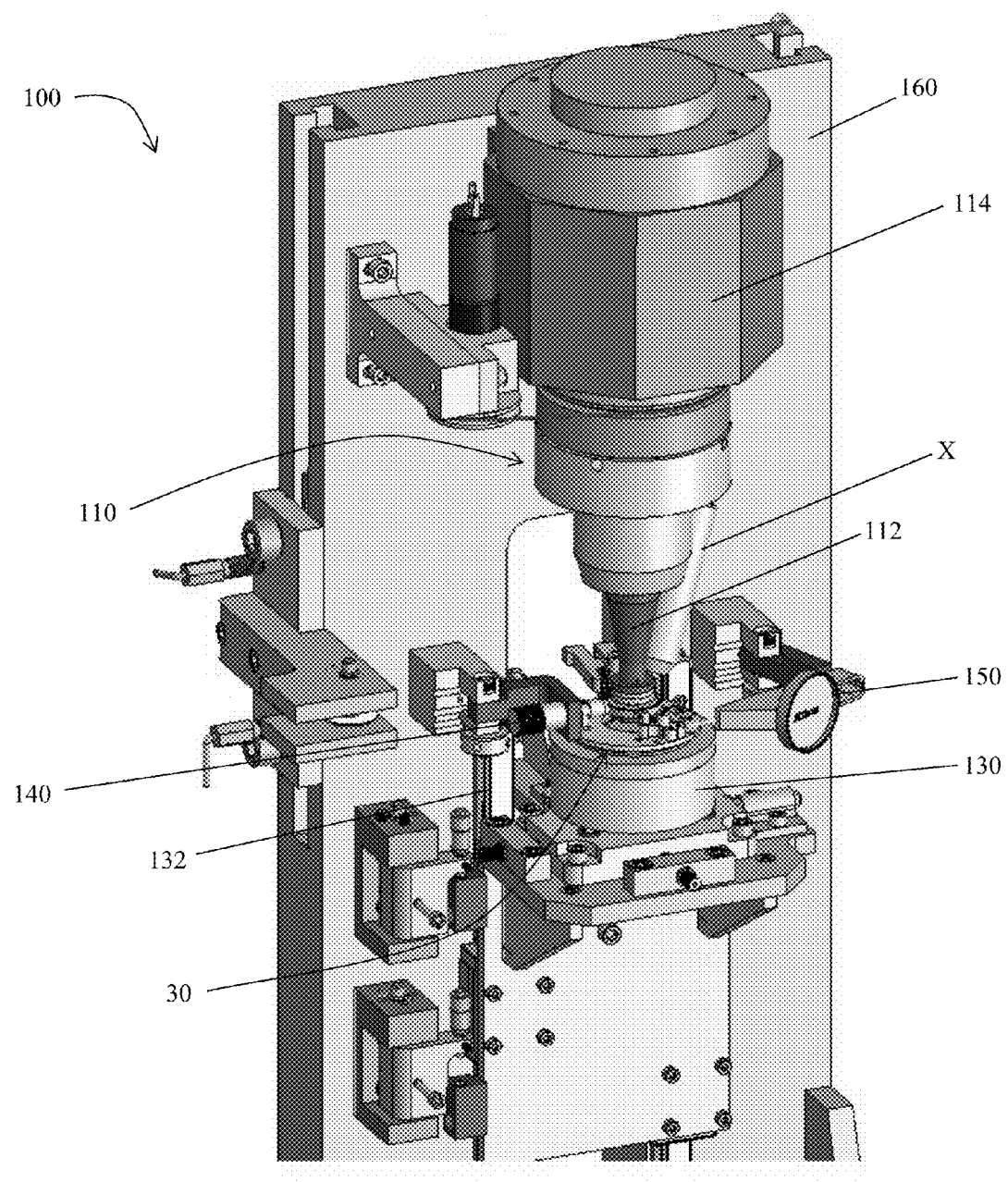
FIG. 4 is a front perspective view of a system for mounting lenses in lens assemblies according to various embodiments.

FIG. 4 shows an air bearing lens mounting system 100, which may be used in various embodiments, for mounting a lens. The system 100 includes an air bearing spindle assembly 110 including a spindle 112 which rotates on an air bearing 114 and a vacuum source 116 which creates a vacuum within the central axis of the spindle 112 in order to hold the lens in place on the spindle distal end 118. Alternatively, a different highly precise rotating spindle system may be used such as a machine tool class rotating spindle, rather than an air bearing spindle. The system further includes a stage 130 beneath the spindle 112 and onto which the base 50 of the lens assembly 30 can be mounted. The air bearing spindle assembly 110 and the stage 130 are precisely positioned relative to each other and mounted to prevent misalignment. In the embodiment shown, the stage 130 may be raised and lowered to bring the stage 130 into and out of proximity with the spindle 112 while maintaining precise alignment during the mounting procedure. The system further includes a micropositioner 140 and a position gauge 150. Both the micropositioner 140 and the gauge 150 are mounted such that their heads are at the same vertical height as the lens when the system is in use and can be moved horizontally toward and away from the lens as needed. The system also includes an ultraviolet light source which may direct light at the adhesive used for attaching the lens 40, 70 to the lens cell 60, 80. The system further includes a motor (not shown), such as a commercially available linear motor such as those produced by Dover Corporation, which may drive the rotation of the air bearing and/or raising and lowering the stage. The motor may cause the air bearing to rotate through the use of a belt and pulley system, for example. Alternatively, a different highly precise rotating spindle system may be used such as a machine tool class rotating spindle, rather than an air bearing spindle. For example, such a rotating spindle using ball bearings such as ABEC-7 ball bearings, may be used.

The system may further include one or more sources of ultraviolet (UV) light which may be used for curing adhesive used for affixing the lens to the lens cell. For example, the system may include a UV light source surrounding the spindle, which may be advanced along the spindle and toward a lens on the head of the spindle, after placement of the adhesive on the edge of the lens in the cell. Alternatively or additionally, the system may include a UV light source separate from the air bearing assembly, which may be moved into proximity to the lens after placement of adhesive on the edge of the lens in the cell to direct UV light onto the adhesive. Air bearing assemblies which may be used in various embodiments are commercially available from providers such as Nelson Air Corp. (Milford, N.H.), ABTech (Swaney, N.H.), Westwind (Dorset, UK), or Air Bearing Technology (Hayward, Calif.), for example.

In the embodiment shown in FIG. 4, the air bearing spindle assembly 110, the stage 130, the micropositioner 140, and the position gauge 150 are all mounted on a wall 160 or other stable element to maintain their precise relative positions and alignment. Alternatively, one or more components could be mounted to each other or to the floor, for example. The system may further include mechanisms to allow the elements to linearly translate to the precise desired position. In some embodiments, the stage 130 includes a vertical translation element which allows the stage to raise and lower into precise alignment with the spindle and lens, such as by using the motor as described above. The vertical translation element may include a motor or may be manually operated. Alternatively or additionally, the air bearing assembly 110 may include a vertical translation element to likewise allow the air bearing assembly to be raised or lowered in precise alignment with the stage.

Figure 5:
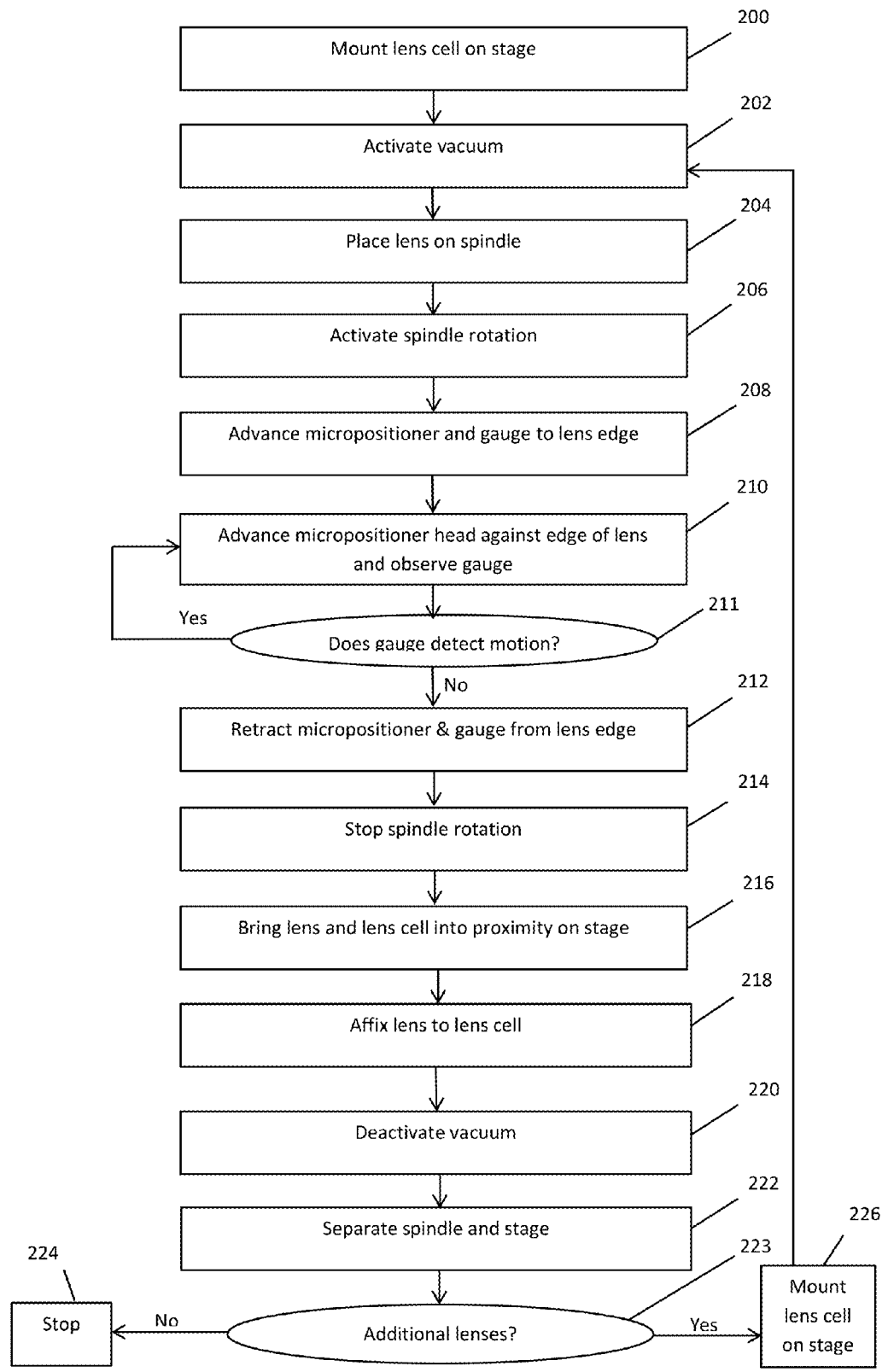
FIG. 5 is a flow chart of a process for mounting one or more lenses in lens assemblies according to various embodiments.
Figure 6A:
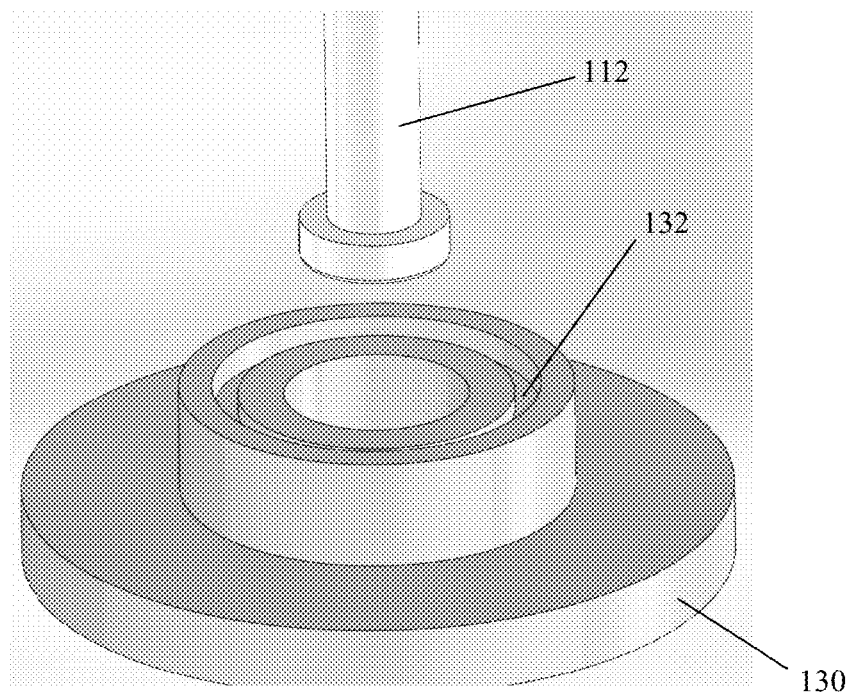
FIGS. 6a and 6b are front perspective views of two embodiments of a vertical stage and spindle for use in various embodiments.
Figure 6B:
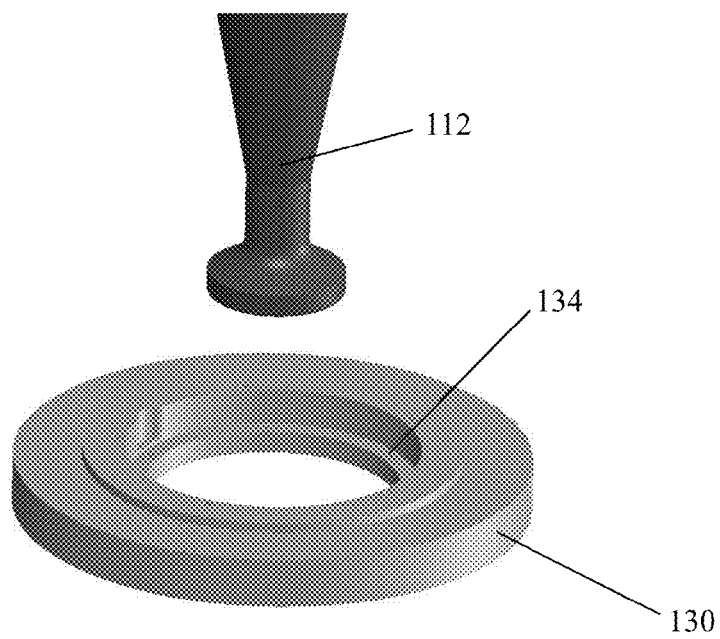

A method of mounting a lens cell according to various embodiments is shown in FIG. 5. In step 200, the base 50 is mounted on the stage 130. The stage 130 is shaped so that the mount 50 can be securely mounted onto it. Two examples of stages 130 which may be used in various embodiments are shown in FIGS. 6a and 6b. In FIG. 6a, the stage 130 includes a circular trough 132, with two side walls, into which a circular projecting portion of a base 50 may be placed to secure the mount on the stage 130. In FIG. 6b, the stage includes a circular trough 134 with only one side wall, into which a circular projecting portion of a base 50 may be seated. Alternatively pegs and holes or other forms of secure positioning may be used. In FIGS. 6a and 6b, the spindle 112 is shown above the stage 130 with the central axis of the stage 130 aligned with the central axis of the spindle 112, which is its axis of rotation.

Figure 7A:
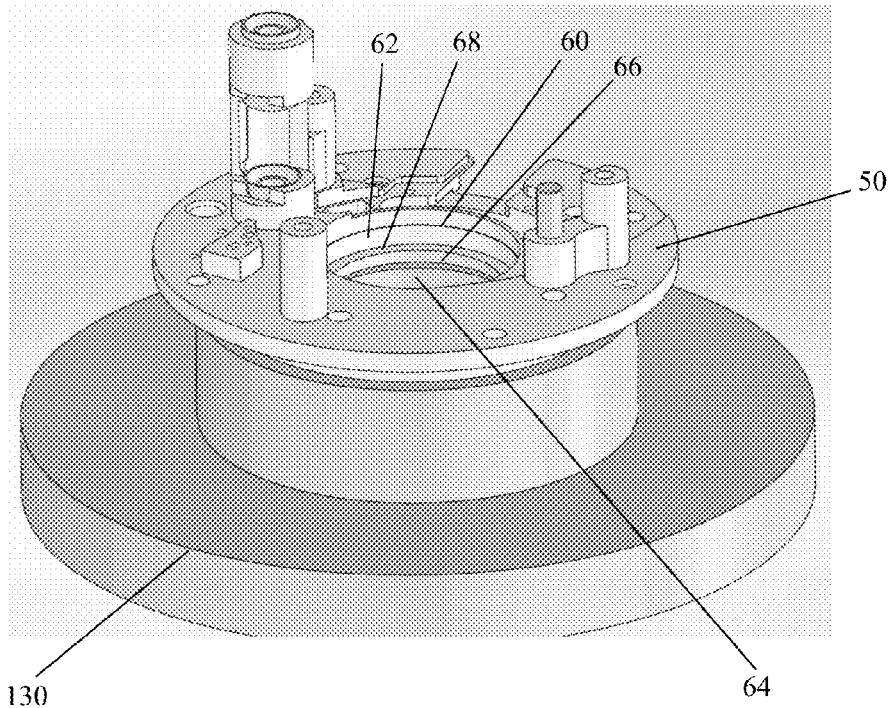
FIGS. 7a and 7b are front perspective views of the two embodiments of FIGS. 6a and 6b, respectively, further including corresponding bases.
Figure 7B:
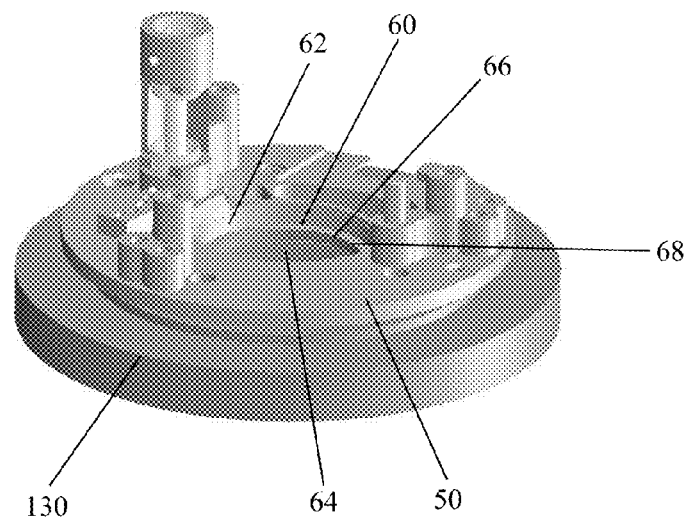

In FIGS. 7a and 7b, a base 50 has been mounted onto the stage 130. The base 50 includes a lens cell 60 having a tubular side wall 62 extending around a central aperture 64 and a lip 66 extending radially inward into the aperture having an upper surface 68 on which the lens 40 (not shown) will rest when assembled. The lens cell 60 is sized such that the inner diameter at the side wall 64 is slightly greater than the outer diameter of the lens 40, while the inner diameter of the lip 68 is slightly less than the diameter of the lens 40.

Figure 8:
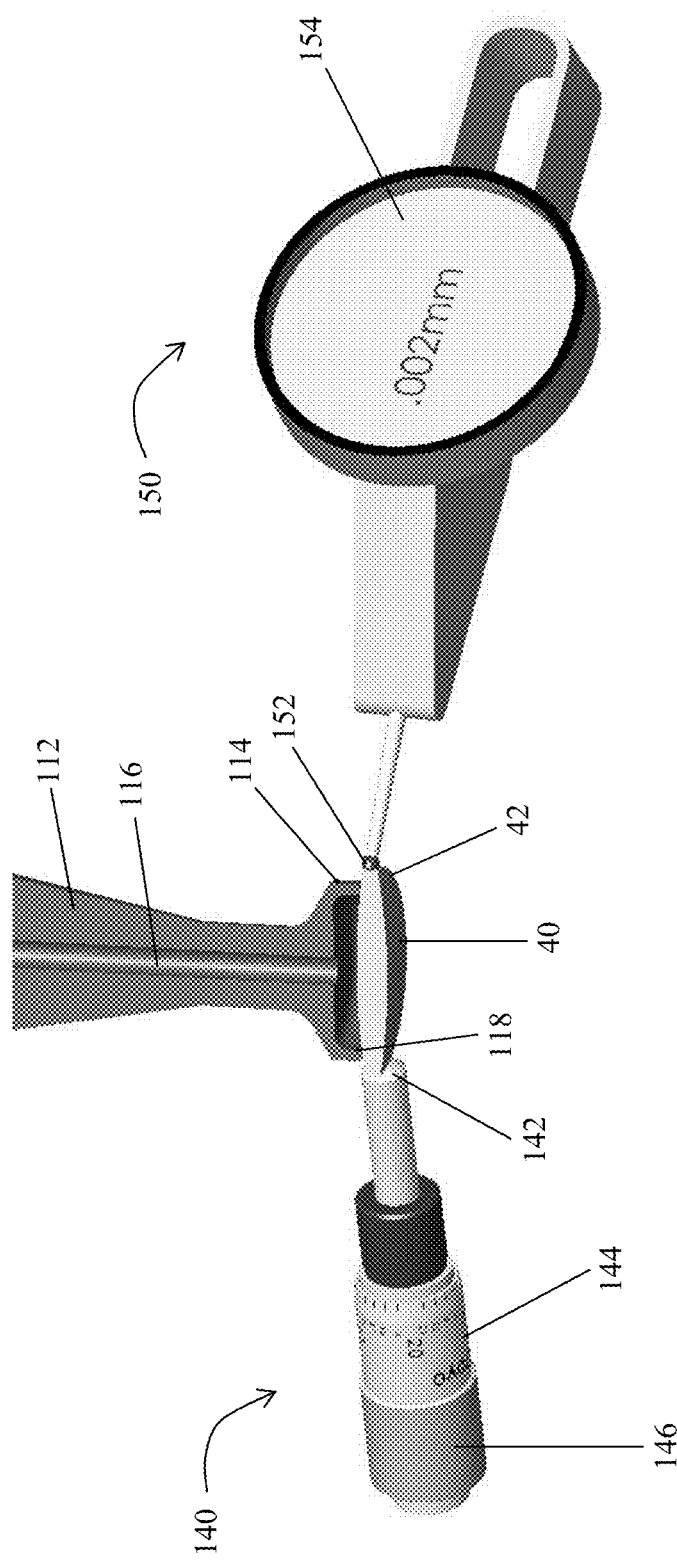
FIG. 8 is a front perspective view of a lens on a spindle head with a micropositioner and gauge.

In step 202, the vacuum is activated, and the lens 40 is then placed on the end of the spindle 112 in step 204. As shown in FIG. 8, in which the spindle 112 and lens 40 are shown in cross section, the vacuum lightly holds the lens 40 in place on the head 114 of the spindle 112 through vacuum passage 116 which is in airtight communication with the vacuum source to allow transmission of the vacuum to the spindle head 114. The vacuum is sufficient to prevent the lens 40 from falling off the spindle 112 but is light enough to allow the lens 40 to be moved relative to the spindle head 114 when nudged by the micropositioner 140. The edge 118 of the spindle head 114 which contacts the lens 40 is circular and has a rounded contour. The edge 118 may be rounded as shown and may be coated with a durable low friction coating in order to reduce the friction when the lens position is readjusted as it is pushed by the micropositioner 140.

In step 206, the spindle 112 rotation is activated, such that the lens 40 rotates on the spindle head 114 along with the spindle 112. In some embodiments the lens 40 may rotate steadily and quickly, such as between about 20 and about 500 revolutions per minute, such as between about 50 and about 150 revolutions per minute, or about 100 revolutions per minute, for example. The preferred rotational speed of the spindle 112 may depend upon a number of factors, including the diameter of the lens, and may be faster for a smaller lens and slower for a larger lens. However, because the position of the lens 40 has not yet been adjusted, the rotation of the lens 40 will be slightly eccentric, with the central axis of the lens 40 slightly out of alignment with the axis of rotation of the lens 40 which is coaxial with the axis of rotation of the spindle 112.

In step 208, the micropositioner 140 and the position gauge 150 are advanced into contact with the edge 47 of the lens 40 as shown in FIG. 8. They may be brought into contact on opposite sides of the lens 40 as shown, such that an operator can adjust the position of the micropositioner 140 on one side of the lens 40 while watching and monitoring the gauge 150 on the other side.

The micropositioner 140 may be any device which is able to advance very gradually against the edge 42 of the lens 40 and which has a low friction head 142 so that it does not disrupt rotation of the lens 40. The micropositioner 140 may be a micrometer, such as those commercially available from manufacturers such as Mitutoyo America (Aurora, Ill.), Starrett Company (Athol, Mass.), Thor Labs Inc. (Newton, N.J.), Newport, and Fowler (Newton, Mass.), which the operator can advance in micro-increments by spinning the advancement component. The micropositioner 140 may allow the operator to advance the micropositioner head 142 in increments of approximately 0.004 inches to 0.025 inches per revolution of the thimble, such as 0.004 inches per rotation of the thimble. The head of the micropositioner may be capable of advancing in controlled increments as small as 0.00005 inches, or as small as 0.0001 inches, for example. It may be able to advance a total distance of approximately 0.3 inches, for example.

The micropositioner 140 may be securely mounted on a horizontal translation element to allow an operator to bring it toward and away from the spindle head 114. In some embodiments, the micropositioner 140 may be advanced toward the lens 40 in step 208 by first translating it into proximity with the lens 40 using the horizontal translation element, and then by advancing the head of the micropositioner out of the body of the micropositioner just until contact is achieved with the lens edge 42. When in position, the central axis of the micropositioner is perpendicular to and intersects the axis of rotation of the spindle 112. The gauge 150 may likewise be securely mounted to a horizontal translation element to allow the operator to bring it toward and away from the spindle head 114.

In step 210, the micropositioner head 142 is advanced while the operator observes the gauge 150. Advancing the micropositioner head 142 gently pushes the lens 40 while it is spinning on the spindle 112 to reposition it slightly on the spindle head 114. As the micropositioner head 142 is advanced, it contacts the high point of the lens edge 42 at each eccentric revolution. That is, because the central axis of the lens 40 is not yet perfectly aligned with the axis of rotation of the spindle 112, rotation of the lens 40 is eccentric with a location on the lens edge 142 forming a high point that extends slightly farther from the axis of rotation than the remainder of the lens edge 142. As the micropositioner head 142 contacts the lens edge 42 as it is advances, it gives a slight push to the rotational highpoint which moves the central axis of the lens 40 toward alignment with the axis of rotation of the spindle 112. While the operator advances the micropositioner head 142, the operator observes the gauge 150. The micropositioner 140 may be adjusted in small increments to advance the head 142 out of the body, such as in increments as small as about 0.0001 inches. The operator continues to slowly advance the micropositioner 142 until eventually the lens no longer has a highpoint of rotation because its central axis is aligned with the axis of rotation of the spindle 112. At this point, as the lens 40 spins on the spindle 112, the micropositioner head 142 barely makes continuous contact with the lens edge 42.

Alternatively, the micropositioner 140 may be a different device capable of adjusting the positioning of the lens 40 by comparably small controlled amounts. For example, a micro positioning stage, such as one made by Dover (Downers Grove, Ill.), or a mechanical stage or motorized stage or multi-axis stage, such as those available from Thor Labs (Newton, N.J. or Newport, a flexure stage, such as one available from Elliot Scientific (Hertfordshire, UK), a piezo nanopositioner, such as one available from Physik Instrumente (Auburn, Mass.), or a linear actuator, such as one available from Aerotech (Pittsburgh, Pa.).

The motion gauge 150 may be used to detect eccentric rotation as the micropositioner head 142 is advanced by the user in step 210. The motion gauge 140 includes a head 152 which gently contacts the lens edge 42 and which detects the perpendicular movement of the lens edge 42. The motion gauge detects motion of the lens 40 which is perpendicular to its axis of rotation. In the embodiment shown, it detects horizontal movement of the lens 40. Movement of the lens edge 42 may be shown in a dial 154 or other display. In some embodiments, movement of the head 152 as small as 0.001 mm may be detected and displayed. When the central axis of the lens 40 is out of alignment with the axis of rotation of the spindle 112, as described above, there are rotational high points and low points. This eccentric rotation will move the gauge head 152 and the movement will be displayed on display 154. As the operator advances the micropositioner 140, the operator observes the gauge 150 for motion. If the gauge 150 shows that it detects motion in step 211, the operator continues to slowly advance the micropositioner head 142 and observe the gauge 150 in step 210. These steps are repeated until the gauge 150 does not detect motion, at which point the central axis of the lens 40 is aligned with the axis of rotation of the spindle 112 and they are rotating coaxially.

The gauge 150 may be a direct reading dial indicator such as those available from Mitutoyo America (Aurora, Ill.), Starrett Company (Athol, Mass.), Thor Labs Inc. (Newton, N.J.), Newport, and Fowler (Newton, Mass.). In some embodiments, more than one motion gauge 150 may be used. Other examples of gauges 150 that may be used include non-contacting measuring devices such as laser measuring systems, such as those available from Keyence (Itasca, Ill.) or other non-contacting measuring devices such as those available from MTI Instruments (Albany, N.Y.), Capacitec (Ayer, Mass.), and Scientific Instruments Inc (West Palm Beach, Fla.). When a non contacting measuring device is used as the gauge 150, the device is brought into functional proximity with the lens 40 as needed in order to measure the motion of the lens 40 (if not already present at such a location) or otherwise prepared for detecting motion, without contacting the lens 40, and then used to detect motion of the lens 40.

This process of centering the lens 40 on the spindle 112 may be completed very quickly, such as in less than one minute. The result is a lens 40 that is precisely centered on the spindle 112 and aligned with the lens cell 60. The positioning spindle head also ensures that the lens 40 is precisely parallel to the mount 40. As a result, the lens 40 is precisely aligned with the mount 68, with the optical axis positioned as desired and without tilt.

Once the lens 40 is rotating coaxially with the spindle, the lens 40 is in the desired position for insertion into the lens cell 60 and no more positioning of the lens 40 relative to the spindle head 114 is needed. The lens 40 is perfectly centered, and tilt is minimized by the spindle head 114 such as to the amount specified as the edge thickness variation such as may be specified on the lens drawing. The micropositioner 140 and gauge 150 are then retracted and moved away from and out of contact with the lens edge 42 in step 212 and rotation of the spindle 212 is stopped in step 214.

In step 216, the lens 40 is moved into the lens cell 52 by bringing the lens and lens cell into proximity. This may be done, for example, by raising the vertical stage 130, lowering the air bearing assembly 110, or both. The lens 40 may be brought into contact with the upper surface 68 of the cell lip 66, or may be nearly in contact but not quite in contact, with a minute separation distance, such as a gap of about 0.001 to about 0.005 inches, or about 0.001 to about 0.002 inches, between the bottom surface of the lens 40 adjacent to the upper surface 68 of the cell lip 66.

Figure 9:
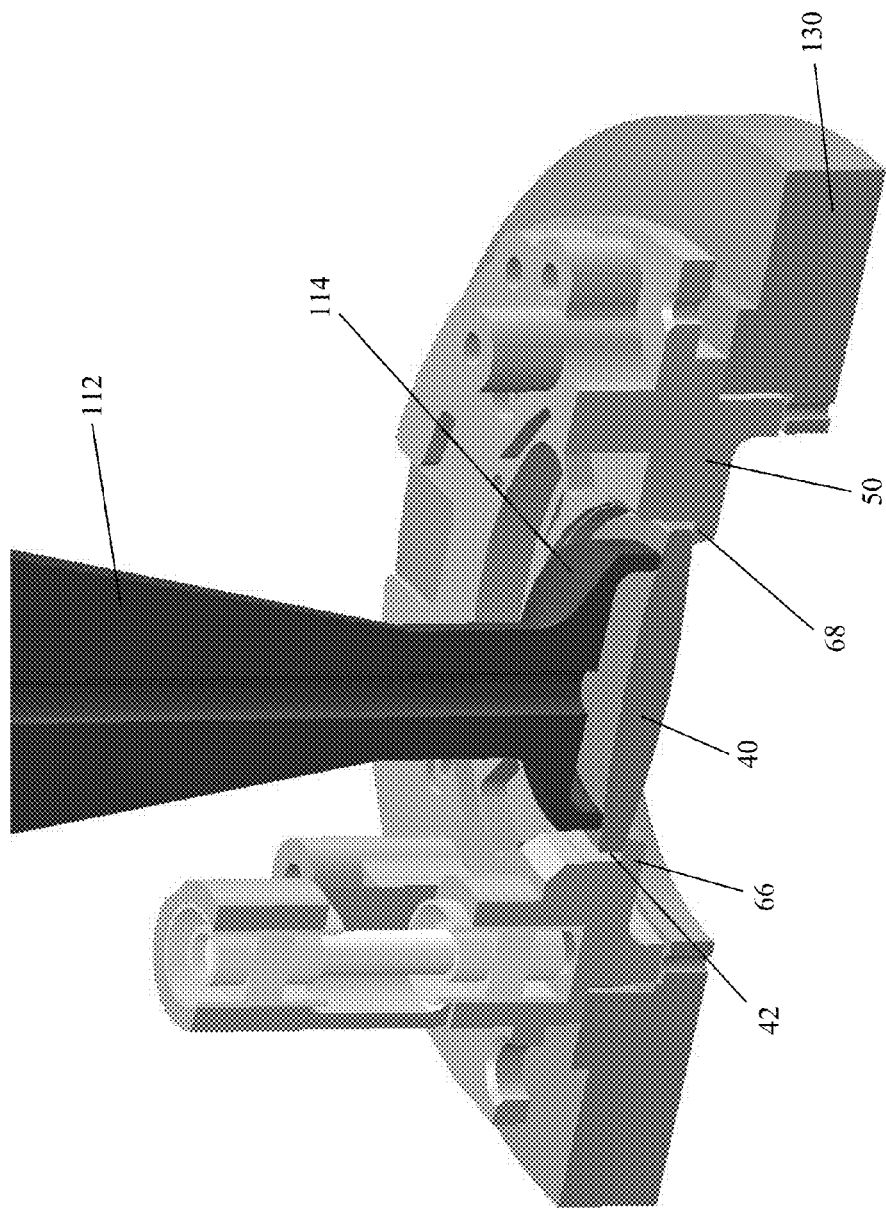
FIG. 9 is a front perspective view, in cross section, of a lens, on a spindle head, being inserted into a lens cell of a base.

Once the lens 40 is in position within the lens cell 60, as shown in FIG. 9 it is affixed to the cell 60 in step 218. This may be achieved by potting, such as by applying a bead of adhesive around the perimeter of the lens edge, 42, continuously or discontinuously, where is abuts or virtually abuts the cell 60. In some embodiments, UV radiation is applied to the adhesive to quickly cure it. Once the lens 40 is securely adhered to the cell 60, the vacuum within the spindle 50 is deactivated in step 220 and the spindle head 114 is separated from the lens 40 in step 222, such as by raising the air bearing assembly 110 and/or lowering the vertical stage 130.

In some embodiments, a two-step process is used for affixing the lens 40 to the lens cell 62. A quicker setting adhesive may first be applied to the lens edge 42, connecting the lens edge 42 to the cell lip 66. For example, discrete beads of adhesive may be applied at various spaced apart locations around the periphery of the lens edge 42, such as at three locations. If a UV adhesive is used, a source of UV light such as a UV light bulb may be brought into proximity with the adhesive beads and the beads of adhesive may then be exposed to UV light from the light source to quickly set the adhesive. The vacuum may then be deactivated and the spindle 112 may be separated from the lens 40 which is now affixed to the lens cell 62. A second layer of adhesive may then be applied around the perimeter of the lens 40, such as a continuous line of adhesive at the lens edge 42 joining the lens edge 42 to the upper surface 68 of the cell lip 66. In such embodiments, the first adhesive holds the lens 40 in place sufficiently to separate the lens 40 from the spindle 112 and for the second adhesive to be applied around the lens to create a more secure bond.

Figure 10A:
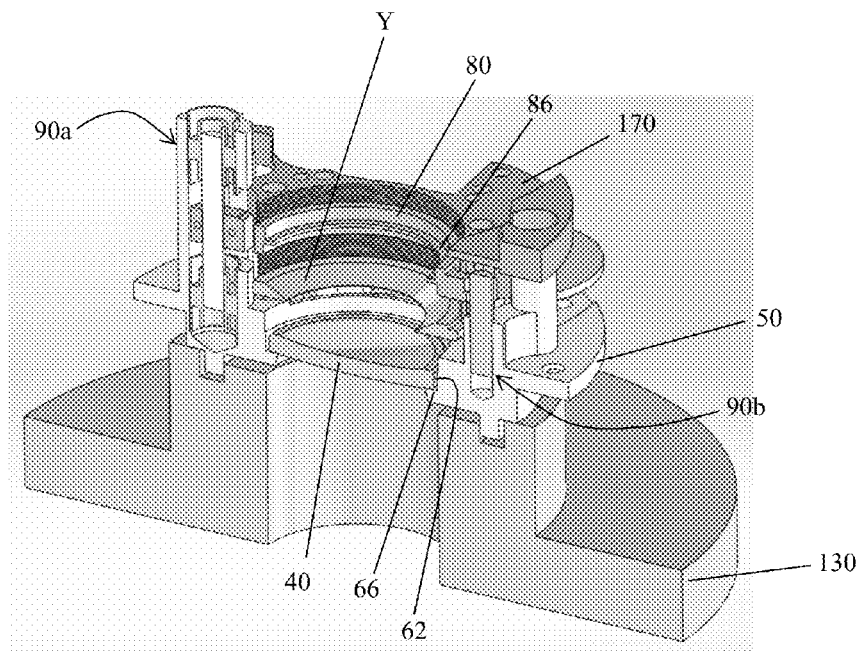
FIGS. 10a and 10b are front perspective views, in cross section, of two embodiments of lens assemblies on mounts, each including a first lens and a second lens cell for a second lens.
Figure 10B:
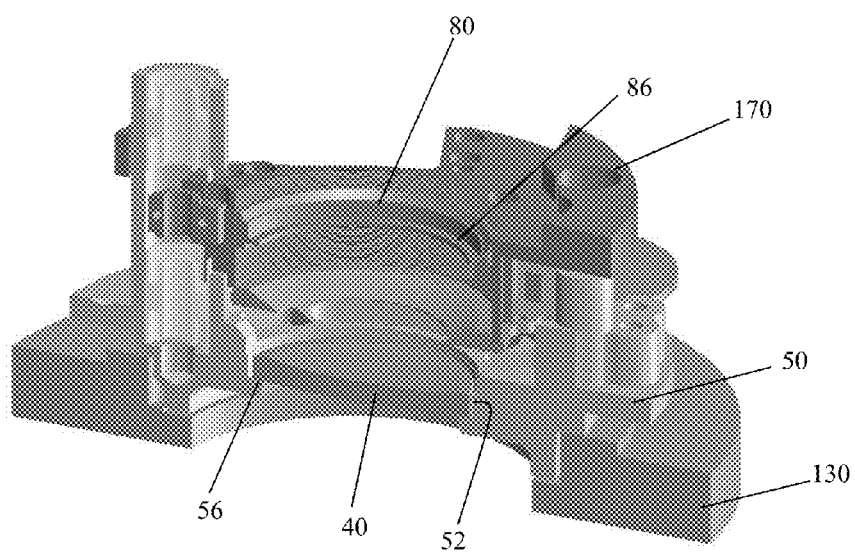

In some embodiments, no further lenses are attached to the lens assembly and the process is stopped at step 224. Additional lens assembly components may be attached to the assembly 30 and then the assembly may be removed from the stage 130 for installation into a camera. In other embodiments, additional lenses may be mounted on the lens assembly 30. In such embodiments, additional components such as lens mechanics and an additional lens cell 80 may then be added to the lens assembly 30 at step 226. Examples of assemblies including additional components and a supplemental lens cell 80 are shown in the cross sectional images shown in FIGS. 10*a* and 10*b*. In these figures, the base 50 remains in place in the stage 130 after placement of lens 40 in lens cell 62. The embodiments of the stage 130 and mount shown in FIG. 10*a* correspond to that shown in FIG. 6*a*, while those of FIG. 10*b* correspond to FIG. 6*b*. In these figures, a second lens cell 80 including a lens cell lip 86 is shown, into which a second lens can be placed. Also shown are first and second linear guide systems 90*a*, 90*b*, and shield 170 surrounding second lens cell 80. The shield may protect stray thermal energy, such thermal energy radiated by the lens assembly motor, from landing on the focal plane array. The assembly further includes an optical baffle 96.

Once the assembly 30 is prepared with the additional lens cell 80 and other components and is ready to receive second lens 70, steps 202 through 222 are repeated for placement of the second lens 70. These steps can likewise be repeated again for a third or more additional lenses. For each lens, the relative position of the spindle head 114 to the stage 130 required for positioning each lens with its cell is adjusted as needed.

Figure 11:
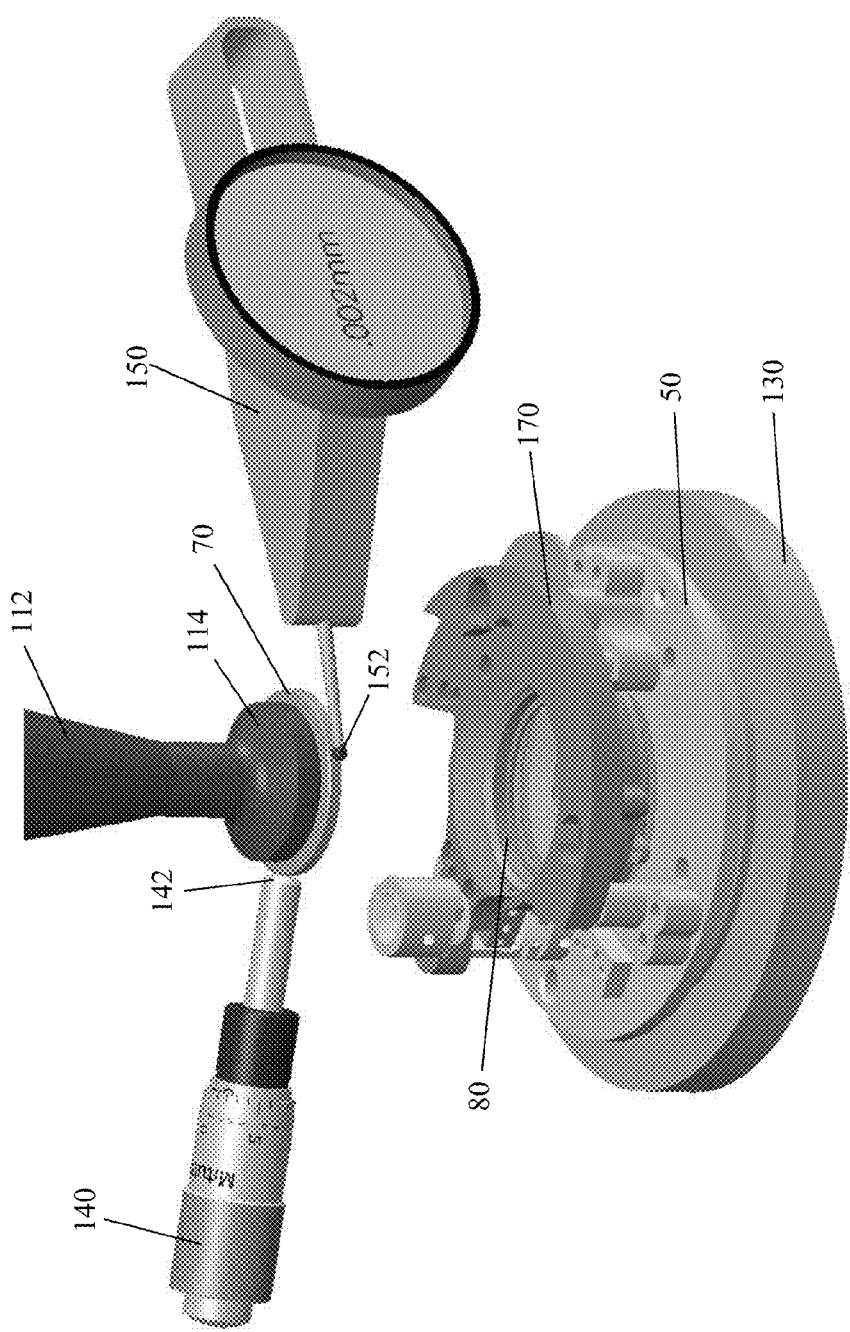
FIG. 11 is a front perspective view of a second lens on a spindle above a partial lens assembly.

FIG. 11 is a partial front perspective view of a second lens 70 positioned on the spindle head 114, with the micropositioner 140 and gauge 150 in contact with the lens 70 for centering the central axis of the lens 70 with the axis rotation of the spindle 112 as described above.

Figure 12:
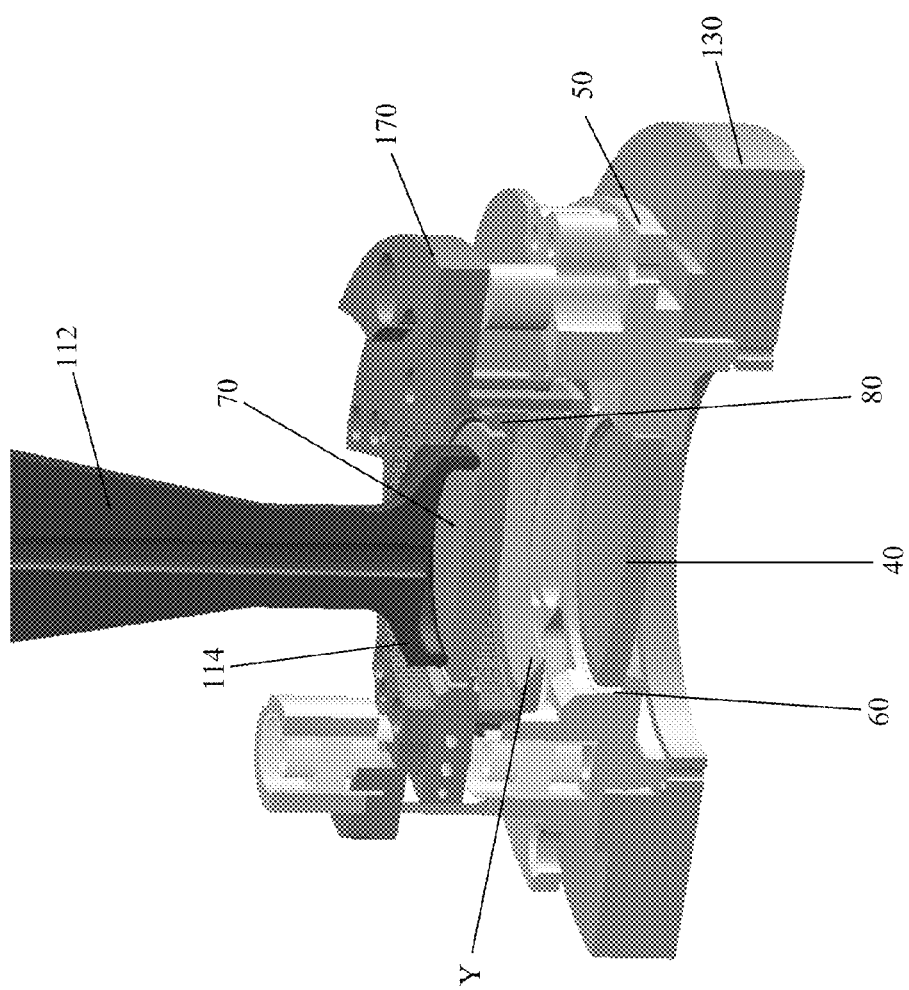
FIG. 12 is a front perspective view, in cross section, of a lens assembly including a first lens, with a second lens on a spindle in a second lens cell.

FIG. 12 is a front perspective view of a portion of the lens assembly 30, in cross section, after placement of the second lens 70 in the second lens cell 80, prior to disengagement of the lens 70 from the spindle head 114. The stage 130 is at the bottom, within the base 50, first lens cell 60 and first lens 40 in position. The second lens cell 80, and second lens 70 are above the first lens 40, with the central axis of each lens 40 70 is aligned and coaxial with the axis of rotation of the spindle 112 when rotating.

Once assembly of the lens assembly 30 is complete, or at least once the lenses have been positioned and affixed into their lens cells, the lens assembly 30 can be removed from the stage 130. It may be ready for use in a camera or other device, or further modifications may be made to the lens assembly prior to placement of the assembly 30 in a device.

By using the systems and methods described herein, one or more lenses may be precisely aligned in their cells and securely adhered in position in the lens assembly with tight de-center and tilt tolerances and low cost mechanics. The component cost is reduced and the assembly time is reduced by eliminating the use of costlier processes such as pinning and potting.

In the foregoing detailed description, the invention has been described with reference to specific embodiments. However, it may be appreciated that various modifications and changes can be made without departing from the scope of the invention. Thus, some of the features of preferred embodiments described herein are not necessarily included in preferred embodiments of the invention which are intended for alternative uses.

The invention claimed is:

1. A system for mounting a lens in a lens cell, the system comprising:
    a spindle assembly including a motor and a spindle which can be activated to rotate about an axis of rotation, the spindle including a head having a surface, an airtight passage within the spindle, and an opening at the end of the airtight passage at the head surface;
    a vacuum source connected to the airtight passage of the spindle to create suction at the opening;
    a stage configured to securely receive a lens mount with a lens cell such that a central axis of the lens cell is coaxial with the axis of rotation of the spindle;
    a micropositioner configured to advance or retract within a plane perpendicular to the axis of rotation;
    a motion gauge configured to detect movement of an object.

2. The system of claim 1 wherein the micropositioner includes a body and a head, wherein the head is configured to be advanced and retracted relative to the body in increments as small as 0.004 inches.

3. The system of claim 1 wherein the motion gauge comprises a dial indicator.

4. The system of claim 1 wherein the motion gauge is configured to detect movement as small as a movement of 0.0001 inches.

5. The system of claim 4 wherein the motion gauge comprises a head, wherein the motion gauge is configured to detect motion of an object when the head is in contact with the object.

6. The system of claim 5 wherein the motion gauge further comprises a display which is configured to display a measurement of movement when movement of an object is detected.

7. The system of claim 1 wherein the motion gauge is configured to advance and retract in the same plane as the micropositioner.

8. The system of claim 1 wherein the stage and the air bearing assembly are mounted in alignment, further comprising a translation element configured to bring the spindle into and out of proximity with the stage while maintaining the alignment.

9. The system of claim 1 further comprising a UV light source.

10. The system of claim 1 wherein the spindle rotates on an air bearing.

11. A system for mounting a lens in a lens cell, the system comprising:
- a spindle assembly including a motor and a vertically oriented spindle, the spindle including a head having a surface at a lower end, an upper end comprising an air bearing, an air passage within the spindle, and an opening at the end of the air passage at the head surface, wherein the spindle is configured to rotate about a central axis on the air bearing;
- a vacuum source connected to the air passage of the spindle to create suction at the opening in the head of the spindle;
- a stage directly beneath the head of the spindle, the stage configured to securely receive a lens mount with a lens cell such that the central axis of the lens cell is coaxial with the central axis of the spindle, wherein the stage is configured to be moved vertically while maintaining the central axis of the lens cell coaxial with the axis of rotation of the spindle;
- a micropositioner configured to advance or retract horizontally, and wherein the micropositioner includes a head which can be advanced or retracted horizontally to a location in proximity to the head of the spindle;
- a motion detection gauge configured to detect motion of a lens when the lens is positioned on the head of the spindle.

12. The system of claim 11 wherein the micropositioner includes a body and a head, wherein the head is configured to be advanced and retracted relative to the body in increments as small as 0.004 inches.

13. The system of claim 11 wherein the motion gauge comprises a dial indicator and wherein the motion gauge is configured to detect movement as small as a movement of 0.0001 inches.

14. The system of claim 13 wherein the motion gauge comprises a head, wherein the motion gauge is configured to detect motion of an object when the head is in contact with the object, further comprising a display which is configured to display a measurement of movement when movement of an object is detected.

15. The system of claim 11 wherein the motion gauge is configured to advance and retract horizontally in the same plane as the micropositioner to a location in proximity with the lens when the lens is positioned on the head of the spindle.

16. The system of claim 11 wherein the spindle assembly includes an air bearing upon which the spindle is configured to rotate.

17. The system of claim 11 further comprising a UV light source.

* * * * *